Patented Nov. 14, 1944

2,362,464

UNITED STATES PATENT OFFICE 2,362,464

AMINE SALTS OF POLYHALO-PHENOLS

Edgar C. Britton and John N. Hansen, Midland, Mich., assignors to The Dow Chemical Company, Midland, Mich., a corporation of Michigan No Drawing. Application April 30, 1941, Serial No. 391,092

7 Claims. (Cl. 260—583)

This invention relates to amine salts of phenols and is particularly concerned with the addition products of polyhalo-phenols with alkylene-diamines and polymethylene-diamines having the following formula:

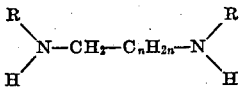

wherein R represents an alkyl, alkenyl, hydroxyalkyl, cycloalkyl, or aralkyl radical or hydrogen, and $n$ is an integer, and to parasiticidal compositions comprising such amine salts as active toxicants. For purpose of convenience the amines employed as starting materials in the preparation of the foregoing compounds are hereinafter referred to generically as alkylene-diamines.

We have prepared representative members of the above-identified group of compounds and found them, for the most part, to be crystalline solids somewhat soluble in many common organic solvents and relatively insoluble in water. These compounds are stable to light and air, and not appreciably affected by carbon dioxide.

The new compounds are prepared by reacting a suitable amine compound such as ethylene-diamine, propylene-diamine, N.N'-dibutyl-ethylene-diamine, or N-cyclohexyl - propylene-diamine, with a solution of a polyhalo-phenol in benzene, chlorobenzene, toluene or alcohol. In this reaction either a mono-salt or di-salt may be formed depending upon the proportions of reactants employed. The expression "mono-salt" as herein employed refers to an alkylene-diamine addition compound with a polyhalo-phenol in which but one molecule of the phenol is associated with each alkylene-diamine molecule. The expression "di-salt" refers to amine addition salts in which 2 molecules of the polyhalo-phenol are associated with each molecule of the alkylene-diamine.

In carrying out the reaction any suitable proportions of reactants may be employed. It has been found that the mono-salt is obtained in good yield when equimolecular proportions of the polyhalo-phenol and the amine or a molecular excess of the amine is employed. The di-salt is obtained in good yield, and as the primary product of reaction, when at least two molecular proportions of polyhalo-phenol are employed for each molecular proportion of the amine. Where an unreacted excess of one or the other reactant is present in the final product, separation is readily accomplished by extraction of the crude amine addition salt product with benzene or other selective solvent for the polyhalo-phenol or amine and in which the amine salt is difficultly soluble.

The operating temperatures employed in the reaction are not critical, although reduced amounts of solvent are required at somewhat elevated temperatures, e. g. between about 40° and 120° C. and conveniently at the boiling temperature of the reaction mixture. While the reactants and solvent may simply be mixed together, a convenient method of operation comprises adding a solution of one reactant to the other. To ensure the formation of a relatively homogeneous product and to minimize occlusion, the amine is preferably added portionwise with stirring to a solution of the polyhalo-phenol over a short period of time. Following completion of the reaction, the mixture is filtered or otherwise manipulated to separate out the amine salt which may be further purified by washing with small amounts of organic solvent as described above or by recrystallization. The amine addition compound is dried at a temperature calculated to volatilize residual traces of solvent.

An alternate method comprises carrying out the reaction in aqueous solution. In this mode of procedure an alkali metal salt of the selected polyhalo-phenol is reacted with the hydrochloride or other water soluble inorganic acid salt of the amine, it being sufficient to contact aqueous dispersions or solutions of the reactants one with the other. The amine salt so obtained is generally sufficiently insoluble in water that there is little problem of separation and isolation.

The following examples set forth certain embodiments of the invention but are not to be construed as limiting the same.

Example 1

53.3 grams (0.2 mol) of pentachloro-phenol was dissolved in 75 millimeters of boiling alcohol and 14.8 grams (0.2 mol) of propylene-diamine added portionwise thereto with stirring. As the amine was added a white crystalline precipitate formed very rapidly. After 15 minutes of heating and stirring the reaction mixture was filtered and the crystalline residue washed with cold alcohol and dried at 70° C. 50.5 grams of the propylene-diamine mono-salt of pentachloro-phenol was thereby obtained as a white crystalline compound melting at approximately 200° C. This compound was soluble to the extent of 0.379 gram per 100 grams of water at 25° C. The saturated water solution had a pH of 9.4.

Example 2

39.5 grams (0.2 mol) of 2.4.6-trichloro-phenol was dissolved in 50 milliliters of boiling benzene and 14.8 grams (0.2 mol) of propylene-diamine added portionwise thereto over a period of 15 minutes. The reaction mixture was warmed and stirred for an additional half hour and thereafter cooled to room temperature, whereupon a white crystalline precipitate separated from solution. The mixture was filtered and the residue recrystallized from 100 milliliters of chloroform, washed with cold chloroform and carbon tetrachloride, and dried to obtain 43.5 grams of the propylene-diamine mono-salt of 2.4.6-trichloro-phenol melting at 103.5°–105° C. This compound was soluble to the extent of 0.964 gram per 100 grams of water at 25° C. The saturated water solution had a pH of 8.3.

Example 3

79 grams (0.4 mol) of 2.4.6-trichloro-phenol was dissolved in 75 milliliters of hot benzene and reacted with 15.3 grams (0.22 mol) of propylene-diamine substantially as described in Example 2. After the reaction was completed the mixture was cooled to obtain the desired addition salt product as heavy white precipitate. This crude material was recrystallized from hot ethyl alcohol and water and thereafter redissolved in hot benzene, clarified with activated bone charcoal and the benzene solution cooled. The resulting dispersion was filtered and the residue dried at 70° C. to obtain 41.5 grams of the propylene-diamine di-salt of 2.4.6-trichloro-phenol as a white crystalline compound melting at 128°–131° C. This compound was soluble to the extent of 0.086 gram per 100 grams of water at 25° C. The saturated water solution had a pH of 7.2.

Example 4

In a similar manner 75 grams (0.4 mol) of 2.4.5-trichloro-phenol and 50.4 grams (0.2 mol) of N.N′ - di-(2 - methyl-cyclohexyl) - ethylene - diamine di-salt of 2.4.5-trichloro-phenol product as a dark red viscous oil having a density of 1.243 at 55°/25° C. This product was soluble to the extent of 0.014 gram per 100 grams of water at 25° C. The saturated amine salt solution had a pH of 7.7.

The N.N′-di-(2-methyl-cyclohexyl)-ethylene-diamine herein employed is a viscous liquid boiling at 165° C. at 8 milliliters pressure and having a specific gravity of 0.92 at 20°/4° C. This compound is prepared by reacting 2-methyl-cyclohexyl-amine with ethylene chloride or ethylene bromide under conditions of elevated temperature and pressure and neutralizing the resultant amine hydrohalide with aqueous sodium hydroxide.

Example 5

23 grams (0.1 mol) of 2.3.4.6-tetrachloro-phenol was dissolved in 50 milliliters of hot benzene and 4.3 grams (0.05 mol) of ethylene-diamine added thereto. The mixture was heated to 75° C. for a period of 15 to 20 minutes, thereafter cooled and filtered to obtain a crude amine addition salt product as a residue. This residue was recrystallized from ethyl alcohol to obtain 12.5 grams of the desired ethylene-diamine di-salt of 2.3.4.6-tetrachloro-phenol as a white crystalline compound melting at 149°–151° C. This compound was soluble to the extent of 0.125 gram per 100 grams of water at 25° C. The saturated water solution had a pH of 7.8.

Example 6

53.3 grams (0.2 mol) of pentachloro-phenol, 10.4 grams (0.1 mol) of N-(beta-hydroxy-ethyl)-ethylene-diamine, were reacted together in the presence of 75 milliliters of ethyl alcohol substantially as described in the foregoing examples. After heating and stirring for some time the mixture was cooled and filtered to separate the crude amine addition product as a crystalline residue. This product was recrystallized several times from ethyl alcohol to obtain the N-(beta-hydroxy-ethyl)-ethylene-diamine di-salt of pentachloro-phenol as a white crystalline compound melting at 140°–144° C. This compound is soluble to the extent of 0.06 gram per 100 milliliters of water at 25 C. The saturated water solution of the amine salt had a pH of 7.1.

Other alkylene-diamines and polymethylene-diamines may be employed as shown in the examples to obtain addition salts of the polyhalo-phenols. Representative of such amine compounds are N.N′-di-isobutenyl-ethylene-diamine, N-cyclohexyl - ethylene - diamine, N-(3-hydroxy-propyl)-ethylene-diamine, N.N′ - dibenzyl-butylene-diamine, N-(beta-phenylethyl) - hexamethylene-diamine, N.N′ - diethyl - octamethylene-diamine, N-isobutyl-propylene - diamine, N.N′-di-propyl-ethylene - diamine, 1.6-diamino - hexane, 1.4-diamino-butane, 1.10-diamino-decane, 1.6-di-amino-3-tertiary-butyl-hexane, heptamethylene-diamine, amylene-diamine, etc. In place of the polychloro-phenols shown in the examples, other representative polyhalo-phenol compounds such as 2.4.6-tribromo-phenol, 2-bromo-3.4.6-trichloro-phenol, 2.5-dichloro-phenol, 2.4-dichloro-6-phenyl-phenol, 2.6-dichloro-4-cyclohexyl-phenol, 2.6-dibromo-4-benzyl-phenol, 2.4.5-trichloro-6-methyl-phenol, and the like may be employed.

The alkylene-diamine and polymethylene-diamine addition salts of polyhalo-phenols as set forth in the preceding examples may be used as active toxicants in parasiticidal compositions. While all of these compounds exert a definite bactericidal action, some have been found particularly well adapted for use in insecticidal and fungicidal spray or dust compositions for the control of plant parasites.

When employed in dust mixtures, the salts are preferably dispersed in and on solid, finely divided, inert carriers such as diatomaceous earth, volcanic ash, bentonite, talc, finely divided wood flour, and the like. For dusting purposes, compositions comprising from about 0.5 to 5 per cent by weight of the amine salt are particularly useful.

Dispersions of the amine salts on or in inert carriers may also be suspended in water and employed as agricultural sprays. In preparing dust mixtures for use in such aqueous compositions, the amine salts may be employed in amounts up to 50 per cent by weight of the finely divided solid concentrate, although from 15 to 25 per cent by weight is preferred. Similarly, aqueous solutions or dispersions of the amine salts are useful in parasiticide and bactericidal control.

Various wetting, sticking, and dispersing agents such as glyceryl oleate, alkali metal caseinates, aluminum naphthenate, alkali metal salts of sulfonated aromatic hydrocarbons and phenols, sodium lauryl sulfate, partially neutralized sulfuric acid derivatives of fatty acids and their esters, blood albumen, soap, and the like may be employed in combination with the new amine salts. Similarly, the amine salts can be combined with other insecticidal and fungicidal agents such as petroleum, fish and vegetable oils, lead arsenate, sulfur, copper sprays, etc., for the control of various insect and fungous pests.

Representative results in the control of plant parasites have been obtained with an emulsion comprising 0.24 gram of the ethylene-diamine di-salt of 2.3.4.6-tetrachloro-phenol, 3 milliliters of a commercially available miscible petroleum oil and 97 milliliters of water. This composition was found to give a control of 97.8 per cent against the eggs of *L. kalmii* Stal. A similar composition in which the propylene-diamine mono-salt of pentachloro-phenol in the amount of 0.06 gram was employed along with the commercial miscible oil and water gave a control against the eggs of *L. kalmii* Stal. of 58.9 per cent.

A further determination was made in which 0.6 milliliter of a partially neutralized sulfonated sperm oil, 2.4 milliliters of a dormant spray oil and 0.24 gram of the ethylene-diamine di-salt of 2.3.4.6-tetrachloro-phenol were mixed together to form a concentrate. The composition was made up to 100 milliliters with water and applied for the control of the eggs of *L. kalmii* Stal. The mortality of the eggs so treated ranged between 94 and 98 per cent.

Among the compounds with which the present invention is particularly concerned are those having the following general formula:

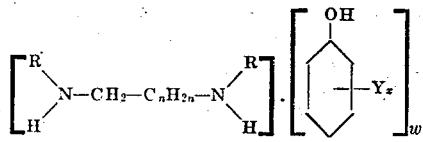

wherein R represents a member of the group consisting of alkyl, alkenyl, hydroxy-alkyl, cycloalkyl, and aralkyl radicals, and hydrogen, Y represents halogen, $n$ is an integer, $x$ is an integer from 2 to 5, inclusive, and $w$ is an integer not greater than 2. The mono-salts falling within this group of compounds have the probable formula:

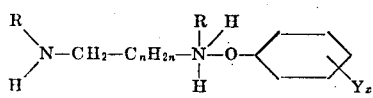

wherein R, Y, $n$, and $x$ are as set forth above. Similarly, the di-salts may be identified as those having the formula:

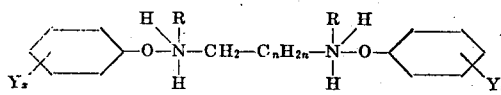

in which R, Y, $n$, and $x$ are as previously identified.

We claim:

1. A compound having the formula:

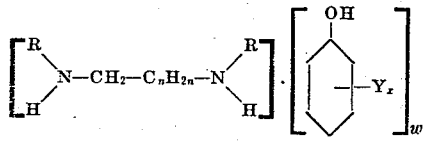

wherein R represents a member of the group consisting of alkyl, alkenyl, hydroxy-alkyl, cycloalkyl, and aralkyl radicals and hydrogen, Y represents halogen selected from the group consisting of chlorine and bromine, $n$ is an integer from 1 to 9, inclusive, $x$ is an integer from 2 to 5, inclusive, and $w$ is an integer not greater than 2.

2. A compound having the formula:

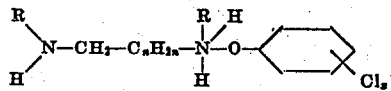

wherein R represents a member of the group consisting of alkyl, alkenyl, hydroxy-alkyl, cycloalkyl, and aralkyl radicals and hydrogen, $n$ is an integer from 1 to 9, inclusive, and $x$ is an integer from 2 to 5, inclusive.

3. A compound having the formula:

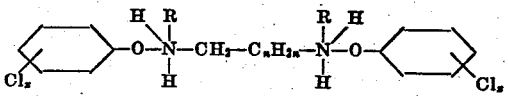

wherein R represents a member of the group consisting of alkyl, alkenyl, hydroxy-alkyl, cycloalkyl, and aralkyl radicals and hydrogen, $n$ is an integer from 1 to 9, inclusive, and $x$ is an integer from 2 to 5, inclusive.

4. A compound having the formula:

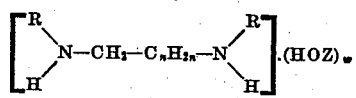

wherein R represents a member of the group consisting of alkyl, alkenyl, hydroxy-alkyl, cycloalkyl, and aralkyl radicals, and hydrogen, $n$ is an integer from 1 to 9, inclusive, $w$ is an integer not greater than 2, and HOZ represents a phenol of the benzene series characterized by at least one halogen selected from the group consisting of chlorine and bromine substituted in the oxygenated benzene nucleus.

5. An ethylene-diamine salt of a polychlorophenol having the formula

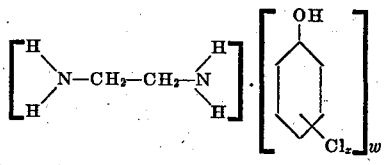

wherein $x$ is an integer from 2 to 5, inclusive, and $w$ is an integer not greater than 2.

6. A propylene-diamine salt of a polychlorophenol having the formula

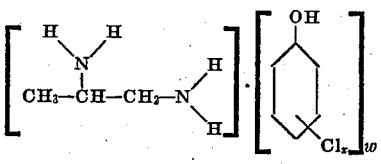

wherein $x$ is an integer from 2 to 5, inclusive, and $w$ is an integer not greater than 2.

7. An ethylene-diamine di-salt of a polychlorophenol having the formula

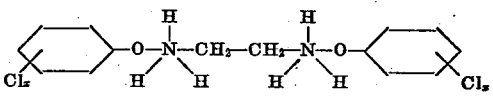

wherein each $x$ is an integer from 2 to 5, inclusive.

EDGAR C. BRITTON.
JOHN N. HANSEN.

CERTIFICATE OF CORRECTION.

Patent No. 2,362,464.   November 14, 1944.

EDGAR C. BRITTON, ET AL.

It is hereby certified that error appears in the printed specification of the above numbered patent requiring correction as follows: Page 2, first column, line 45, Example 4, after "amine" insert the following -

> --were dissolved in 80 milliliters of hot benzene. The mixture was heated to 70°-80° C. and stirred for approximately 30 minutes and thereafter cooled. As no crystals were formed, the crude reaction product was heated on the steam bath to evaporate off the benzene and obtain an N.N'-di-(2-methyl-cyclohexyl)-ethylene-diamine -- and that the said Letters Patent should be read with this correction therein that the same may conform to the record of the case in the Patent Office.

Signed and sealed this 1st day of May A. D. 1945.

(Seal)

Leslie Frazer
Acting Commissioner of Patents.